(12) United States Patent
Bruck

(10) Patent No.: US 8,753,064 B2
(45) Date of Patent: Jun. 17, 2014

(54) TRANSFER ASSEMBLY SUCH AS ASSOCIATED WITH A PRESS OPERATION AND INCLUDING FLUID CYLINDER RELEASED MECHANISM FOR HANDLING PARTS WITH LARGE TWO DIMENSIONAL MEASUREMENTS

(75) Inventor: Stephen C. Bruck, Howell, MI (US)

(73) Assignee: BAE Industries, Inc., Warren, MI (US)

( * ) Notice: Subject to any disclaimer, the term of this patent is extended or adjusted under 35 U.S.C. 154(b) by 142 days.

(21) Appl. No.: 13/450,121

(22) Filed: Apr. 18, 2012

(65) Prior Publication Data

US 2013/0280023 A1 Oct. 24, 2013

(51) Int. Cl.
*B65G 47/50* (2006.01)
*B65G 57/00* (2006.01)

(52) U.S. Cl.
USPC .......................................... 414/794; 414/926

(58) Field of Classification Search
USPC ........ 156/563; 271/192; 294/118, 119, 81.61;
403/43; 414/416.05, 416.06, 416.07,
414/790.3, 792.7, 793.4, 793.7, 793.9, 794,
414/794.2, 794.3
See application file for complete search history.

(56) References Cited

U.S. PATENT DOCUMENTS

| | | | | |
|---|---|---|---|---|
| 2,515,666 A | * | 7/1950 | Rice | 294/63.1 |
| 2,562,247 A | * | 7/1951 | Van Schie | 83/157 |
| 3,410,424 A | * | 11/1968 | Rooney, Jr. | 414/790.8 |
| 3,429,459 A | * | 2/1969 | Paul et al. | 414/791.8 |
| 3,430,784 A | * | 3/1969 | Hall | 414/789.1 |
| 3,469,714 A | * | 9/1969 | Paquette | 414/793.9 |
| 3,483,065 A | * | 12/1969 | O'Brien | 156/563 |
| 3,827,577 A | * | 8/1974 | Kurk et al. | 414/790 |
| 3,907,128 A | * | 9/1975 | Cathers | 414/788.9 |
| 4,030,618 A | * | 6/1977 | Kelley et al. | 414/790.3 |
| 4,648,736 A | | 3/1987 | Harsch et al. | |
| 2012/0027555 A1 | | 2/2012 | Germain et al. | |

FOREIGN PATENT DOCUMENTS

| | | |
|---|---|---|
| DE | 3300227 A1 | 7/1984 |
| DE | 4234997 A1 | 4/1994 |
| EC | 1870355 A1 | 12/2007 |
| JP | 2007290850 A | 11/2007 |
| JP | 2007313857 A | 12/2007 |
| JP | 2008019083 A | 1/2008 |
| JP | 2008074624 A | 4/2008 |
| JP | 2008081270 A | 4/2008 |
| JP | 2009247604 A | 10/2009 |
| JP | 2010166083 A | 7/2010 |
| WO | 2009135552 A1 | 11/2009 |

* cited by examiner

*Primary Examiner* — Gregory Adams
(74) *Attorney, Agent, or Firm* — Gifford, Krass, Sprinkle, Anderson & Citkowski, P.C.; Douglas J. McEvoy

(57) ABSTRACT

A transfer assembly incorporated into a part forming operation including a structure exhibiting a generally open interior. A pair of elongated pivotal supports extend in parallel fashion along inner facing sides of the structure and channel the received opposite edges of each part delivered from the part forming operation. A rotary actuating component is mounted at an intermediate end location of the structure between the sides and pivotally interconnects to the end supports via a pair of linkage arms. A proximity trigger switch determines delivery of a part from the out feed location and, upon being activated, actuates the rotary component to separate the side extending supports to release the part for stacking in plural fashion within the open interior, following which reverse actuation of the rotary component pivotally resets the supports for receiving a subsequent part.

18 Claims, 6 Drawing Sheets

TRANSFER ASSEMBLY SUCH AS ASSOCIATED WITH A PRESS OPERATION AND INCLUDING FLUID CYLINDER RELEASED MECHANISM FOR HANDLING PARTS WITH LARGE TWO DIMENSIONAL MEASUREMENTS

FIELD OF THE INVENTION

The present invention discloses a transfer assembly for progressively stacking thin walled parts, such as is communicable with lifter arms or the like associated with an exit location of a press or other thin walled part forming assembly.

BACKGROUND OF THE INVENTION

The prior art is well documented with examples of part transfer assemblies which employ varying combinations of linkages, lifter arms and the like in order to successively move parts between first and second locations. Relevant examples include the reciprocatingly forward feeding device of Rothbauer (JP2008074624) for regularly forward feeding stacked products on a transporting passage in which the clock speed of the stacked products is increased via a double arm feeding lever exhibiting a pair of regularly operated pushers. The forward feeding lever and the pushers are controlled and driven by a four axis device having a swing shaft and a return rotating shaft for the pushers linked through a linear shaft, along with a rotating shaft and a guide rod. Other examples include the device for transferring an object from one station to another in a production line as disclosed in Chireux EP1870355 and the transfer apparatus of Hiroaki et al., JP2010166083.

SUMMARY OF THE INVENTION

The present invention discloses a transfer assembly which operates, in one non-limiting variant, at an out-feed location of a press (such as which produces any thin walled article in volume). An elevated and four sided structure exhibits a generally open interior and which includes side edge extending support surfaces proximate an upper supporting edges of the structure and between which is received in horizontally fed manner an outputted thin walled article, such as via a conveyor or lifters associated with the press.

A remote edge located proximity switch is mounted to an inner facing location of the structure and is triggered by the received thin walled article at a substantially forward transferred location. Impacting of the trigger switch by the forward fed edge of the article actuates a generally central and upper side edge located and pivotally supported cylinder to extend an associated piston supported rod.

The rod is in turn linkage mounted to a rotary driven component likewise mounted to the structure and including opposite extending arms, which in turn are linkage supported to inner ends of elongated turnbuckle/length adjustable members. Outer ends of the turnbuckle members engage upper pivotally actuating ends of the side edge extending supports, such that actuation of the cylinder in a first rotary direction results in opening of the side edge supports in order to vertically release the part to an underneath positioned pallet. Following drop release (interpreted by lack of presence of the part in relation to the proximity switch), the switch instructs the cylinder to reverse actuate the side edge supports to the inwardly pivoted/closed position in order to receive a subsequent outputted part.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
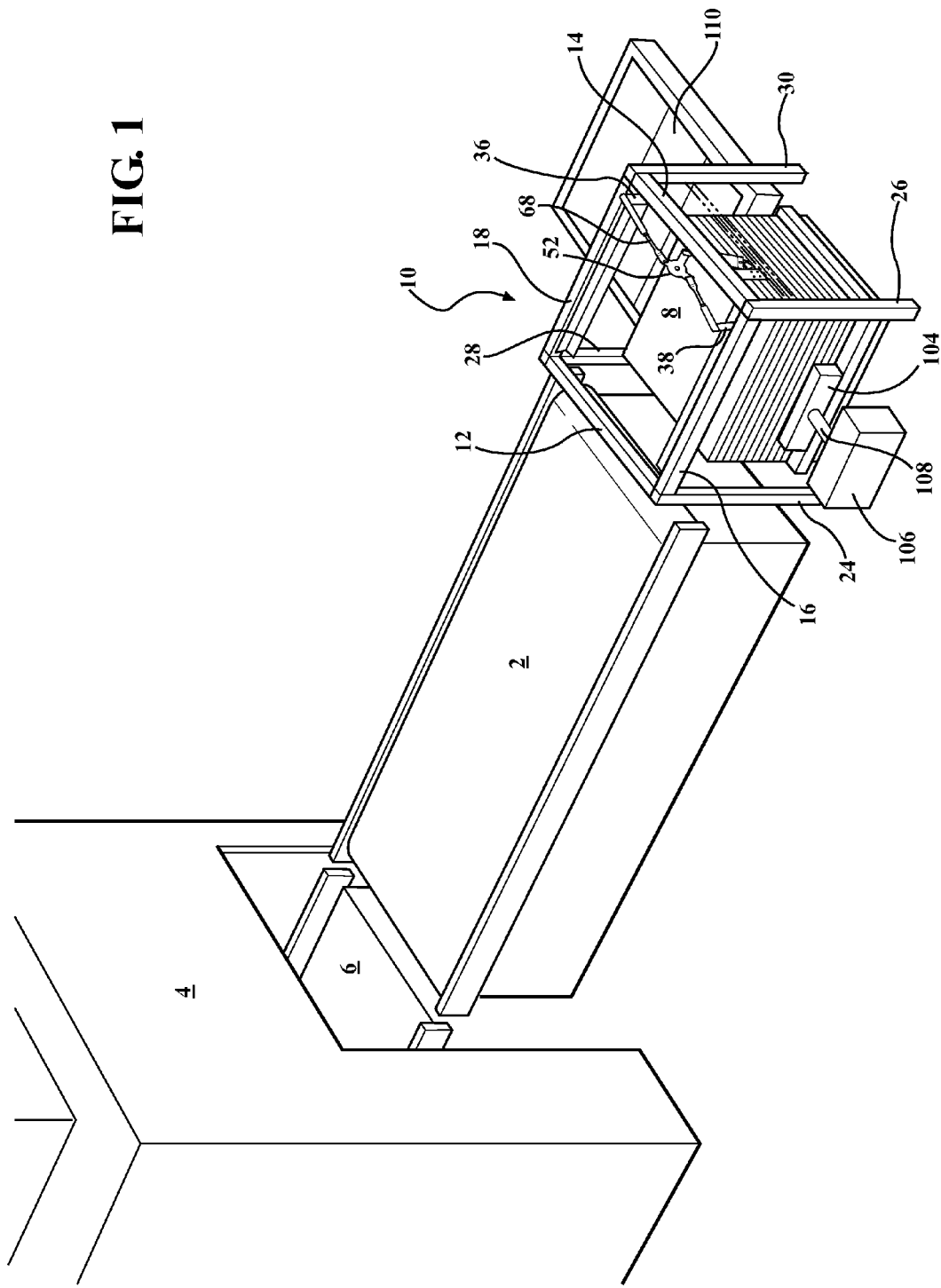
FIG. 1 is an operational perspective of the transfer assembly located at a terminal end of an outlet conveyor associated with a thin walled part forming operation.

Referring initially to FIG. 1, the present invention discloses a transfer assembly, generally depicted at 10, which is located at a terminal end of an outer let conveyor (depicted at 2 and including any of lifter arms, conveyors or the like). The outlet conveyor 2 is in turn associated with any type of thin walled part forming operation, and such as which is representatively depicted at 4 by a large sized press including an inner conveyor 6 which delivers a created part to the outlet conveyor/lifter arms 4 for delivery in turn to the transfer assembly 10.

Without limitation, it is understood that the transfer assembly 10 is capable of being utilized with an configuration of delivery conveyor or lifter arm arrangement, such as which is not limited to any given press or other part forming operation but which can also be utilized in any arrangement in which it is desirous to transfer and stack such parts, whether just formed or otherwise, at a given location and in accordance with any operation.

Figure 2:
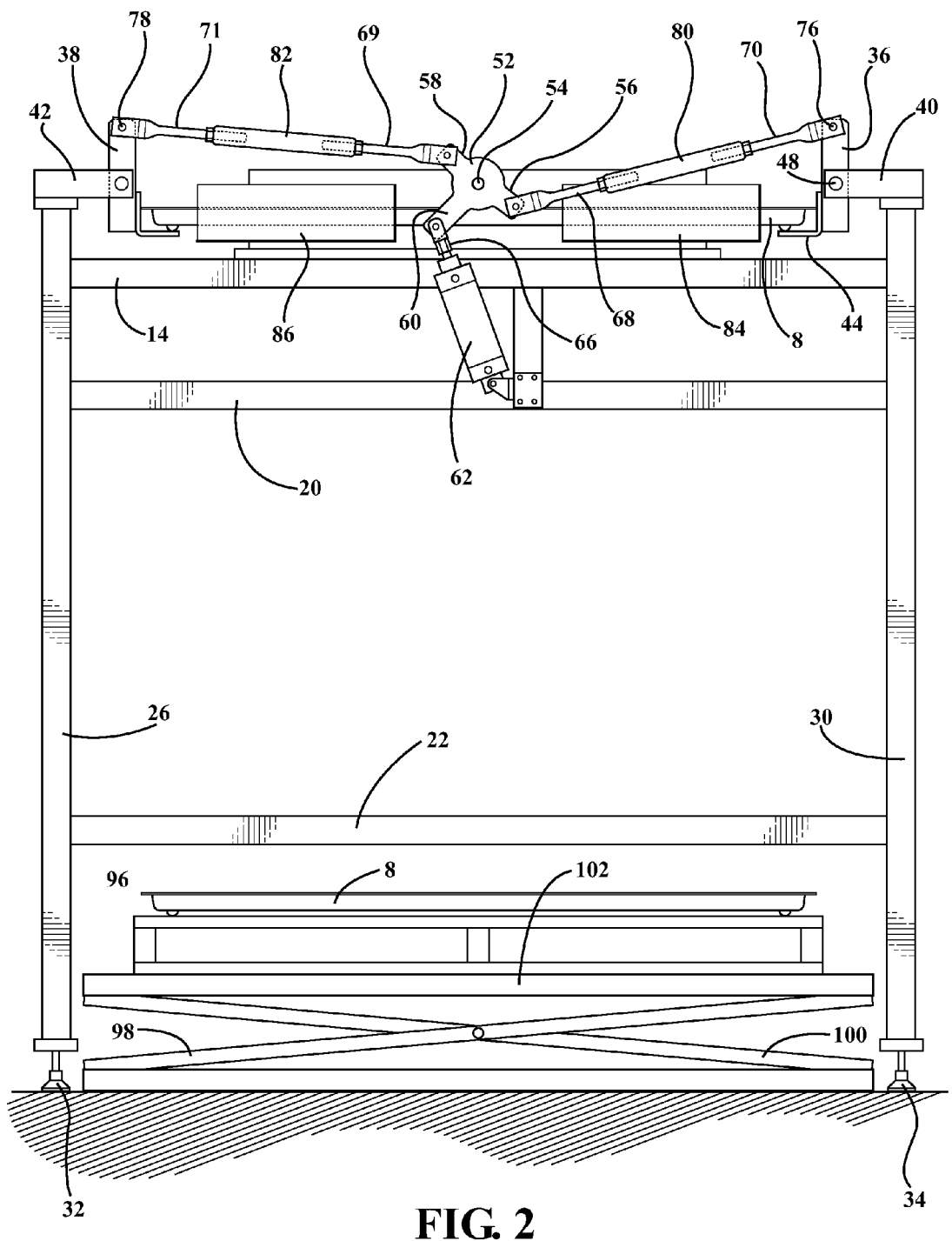
FIG. 2 is an end view of the transfer assembly of FIG. 1 and better showing the features of the cylinder actuated and rotary inducing linkage for pivotally displacing the side supporting edges between a first part contacting position and a second part release/drop position.

With further reference to FIG. 2 et seq., a structure associated with the assembly 10 includes an uppermost perimeter defined by inner 12 and outer 14 ends between which are interconnected sides 16 and 18. The four sides collectively establish a generally open interior, with an upper receiving location of the structure adapted to being located at an equivalent height to the out feed location (conveyor 2) of the preceding part forming operation 4.

As further best shown in FIG. 2, cross braces (see representatively at 20 and 22 extending parallel and below outer end defining perimeter member 14 and can be provided in any arrangement along each of the interconnecting sides. A plurality of four corner located and vertically extending legs 24, 26, 28 and 20 are provided and (as best shown in FIG. 2) can include bottom located and height adjustable pedestals or feet (at 32 and 34 for selected corner legs 26 and 30).

A pair of pivot members 36 and 38 are provided and are mounted proximate the outer/read ends of the sides 16 and 18 via inwardly angled supports 40 and 42 (these depicted in FIG. 2 but removed in the other illustrations for purposes of clarity of description). A pair of "L" cross sectional shaped and angled supports are depicted at 44 and 46 and are mounted to lower and inwardly facing portions of the pivot members 36 and 38 which extend below central pivot points (see further at 48 and 50 in FIG. 2).

Figure 3:
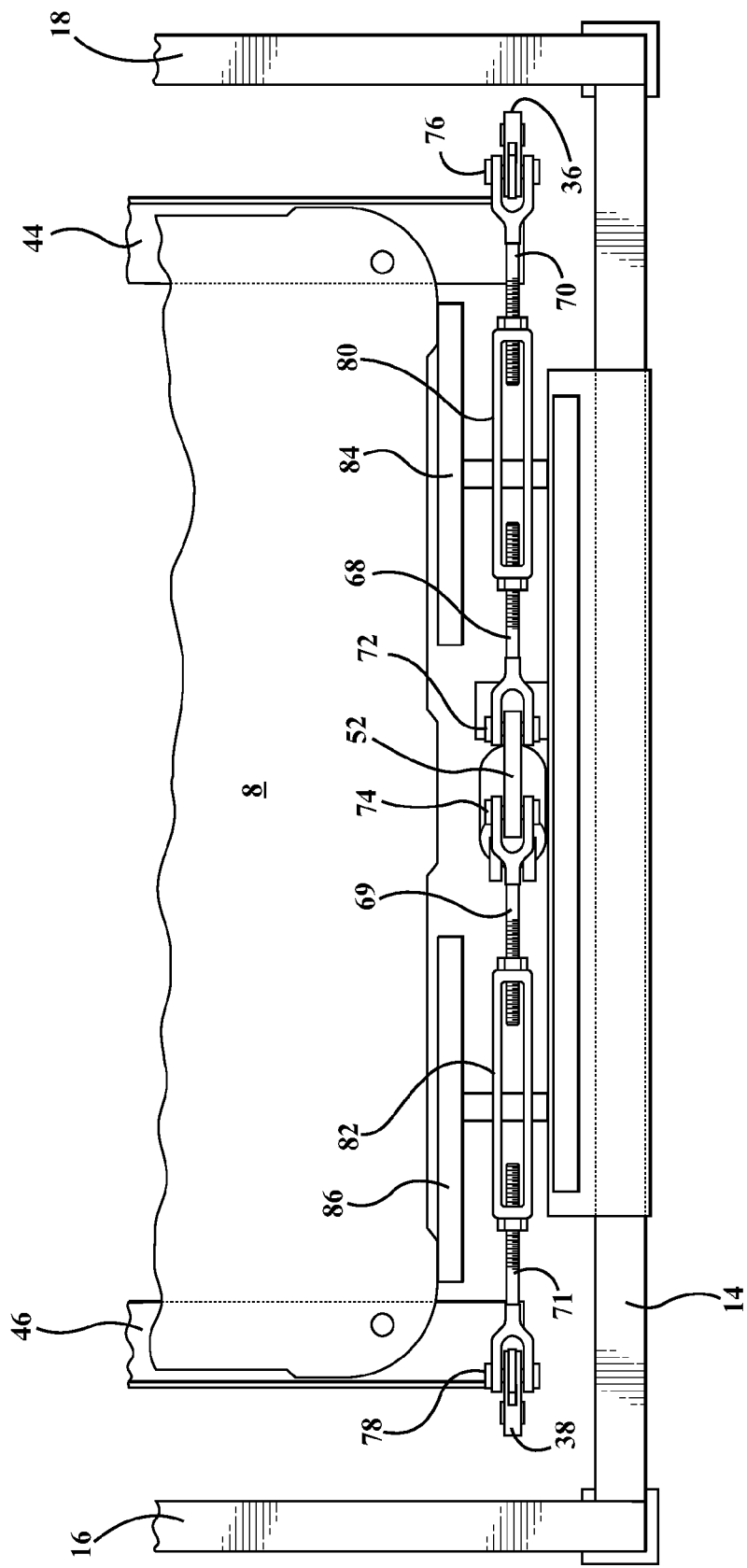
FIG. 3 is an enlarged top view of the rotary to pivot inducing linkage components of the transfer assembly and better illustrating the length-adjustable turnbuckle aspects for precisely calibrating the actuating arms respectively interconnected to the pivotal support edges.
Figure 4:
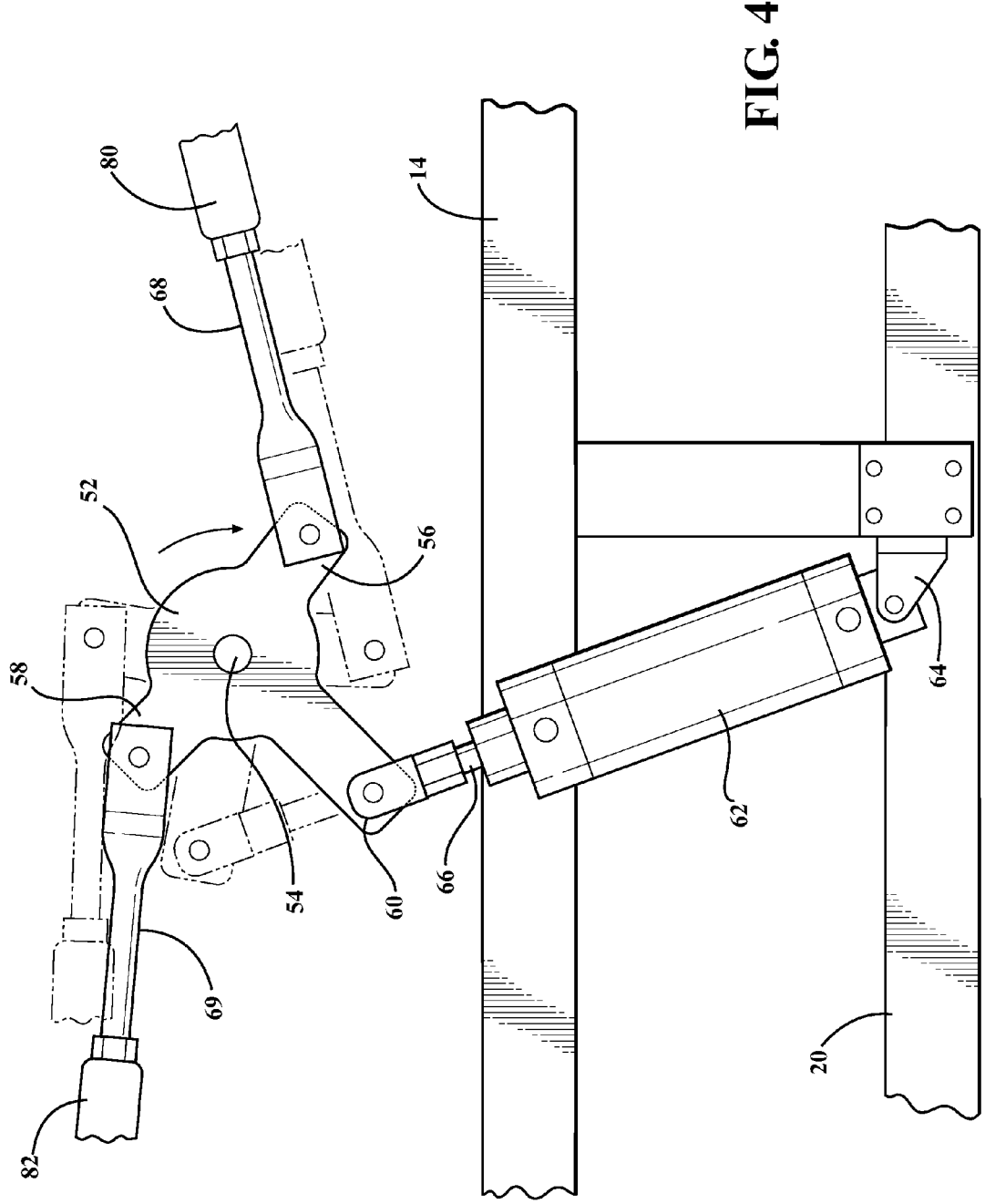
FIG. 4 is an enlarged partial illustration of the central rotary linkage components taken from the end view of FIG. 2 and depicting in phantom the extension of the cylinder piston arm in turn defining a range of counter clockwise rotation of the central linkage supported member with associated actuating positions of the linkage arms likewise depicted in phantom.

Each of FIGS. 2-4 depict a retracted and contacting arrangement provided by the side extending supports (or "L" brackets) 44 and 46 and by which each thin walled part, depicted at 8 throughout the views, is received in a channeled and guided fashion between the upper and angled side supports associated with each "L" bracket 44 and 46 (see further as best shown in FIG. 3). Without limitation, the thin walled parts 8 depicted can include any configuration and/or material of construction and, in the illustrated variant, include such as a bottom assembleable component of a large volume beverage or other heavy load transport housing or container.

Figure 6:
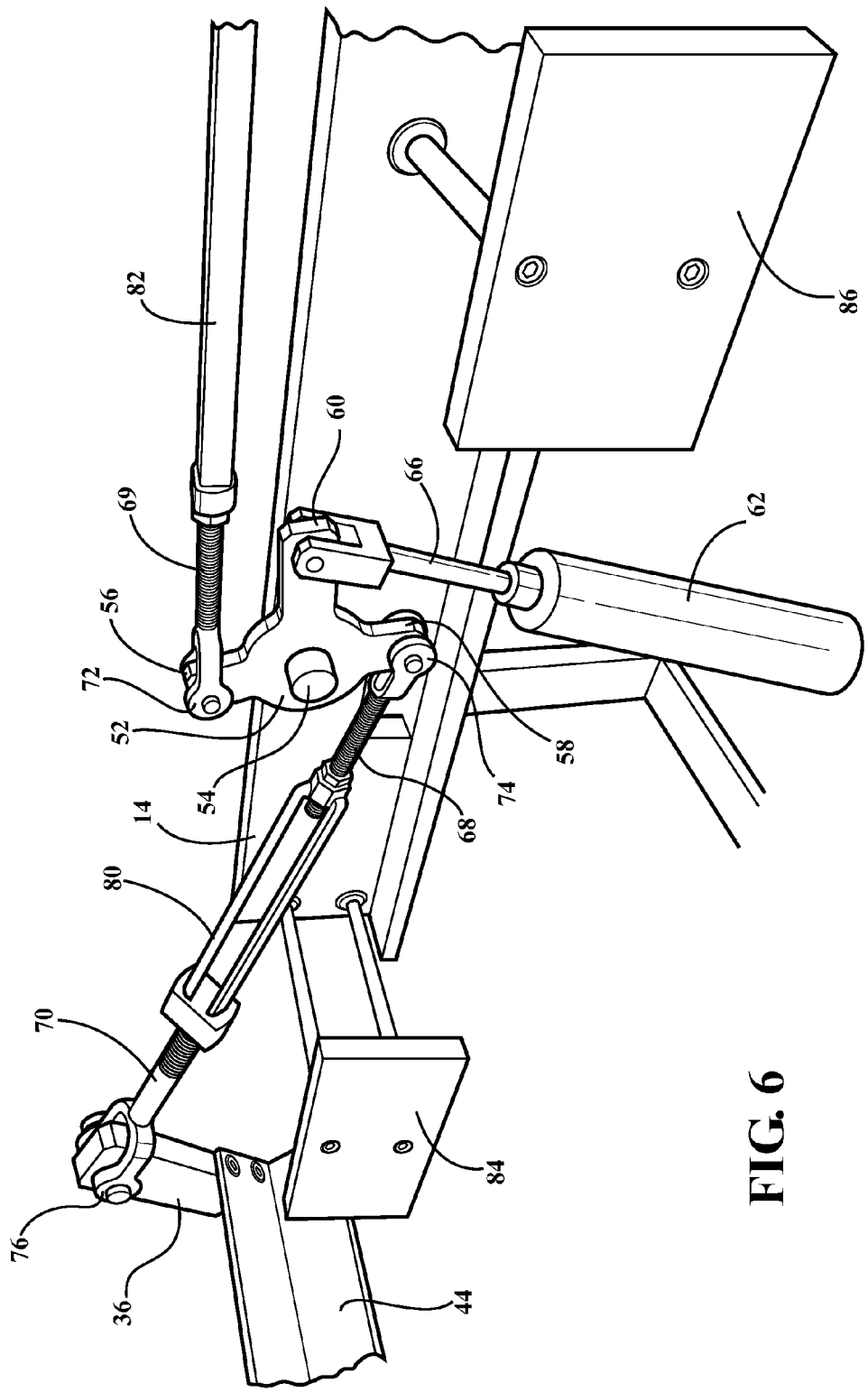
FIG. 6 is a rotated an inner facing perspective of the actuating linkage and better depicting the arrangement of one or more proximity trigger switches for responding to contact with the part by actuating the cylinder in order to pivotally separate the side supporting edges for releasing/dropping the thin walled part.

A rotary actuating component 52 is provided and, as best shown in FIGS. 2, 4 and 6, is mounted to an inside face of the outer end located and uppermost perimeter defining member 14 at an intermediate end location of the overall structure between the outer part receiving/supporting sides 16 and 18. The rotary component 52 further includes a generally centralized and disk or circular shaped portion mounted to the supporting member 14 via a central pivot location 54. A plurality of three individual and pivotal mount locations are established in varying perimeter and radial spaced fashion from the central pivot point and are further identified by projecting end locations 56, 58 and 60.

A fluid actuated cylinder 62 is pivotally mounted to an end location of the structure (such as via mounting bracket 64 to reinforcing cross member 20 as depicted in FIG. 4) in proximity to the rotary actuating component 52. The cylinder 62 includes a piston 66 linearly displaceable in either of two directions by the cylinder 62 and is pivotally mounted to the extending location 60 of the rotary component 52.

A pair of linkage arms are provided (with each linkage arm including a pair of inner 68/69 and outer 70/71 end supporting portions pivotally supported, at the inner ends 68/69, to respective mounting locations 72 and 74 as best shown in FIG. 6 via receiving pins to the projecting locations 56 and 58 of the rotary actuating component 52. The outer ends 70/71 of the linkage arms are also pivotally mounted, via mounting pins 76 and 78, to upper most projecting ends of the pivot members 36 and 38 which in turn support the "L" brackets defining the part supporting and elongated pivotal supports. Each of the linkage arms further includes a rotary adjustable turnbuckle, see at 80 and 82, which receive threadably and adjustably receive the separated portions 68/69 and 70/71 in order to calibrate an overall length of each linkage arm.

At least one proximity trigger switch (with a pair 84 and 86 are shown) are mounted to an end abutting location of structure communicating with the open interior, each of which includes a pad shaped portion which is adapted to being contacted by a forward travelling edge of the part 8 for determining completed delivery of a part from the part forming out feed location. Upon being activated, the trigger switch instructs actuation of the rotary component 52 (such as in the counterclockwise direction depicted in FIG. 4 and as a result of the cylinder 52 extending its piston 66 from the position of FIG. 2 and in solid in FIG. 4 to the phantom position of FIG. 4 corresponding to FIGS. 5 and 6).

This results in the angled "L" bracket side supports 44 and 46 being pivotally and outwardly separated (again FIGS. 5 and 6) in order to release a previously delivered part 8 for stacking in plural fashion within the open interior. Following part release, the trigger reverse actuates the rotary component 52 in order to pivotally reset the side supports 44 and 46 (via the actuation of the pivot members 36 and 38 upon which the angled supports are located) for receiving a subsequently delivered part 8.

Figure 5:
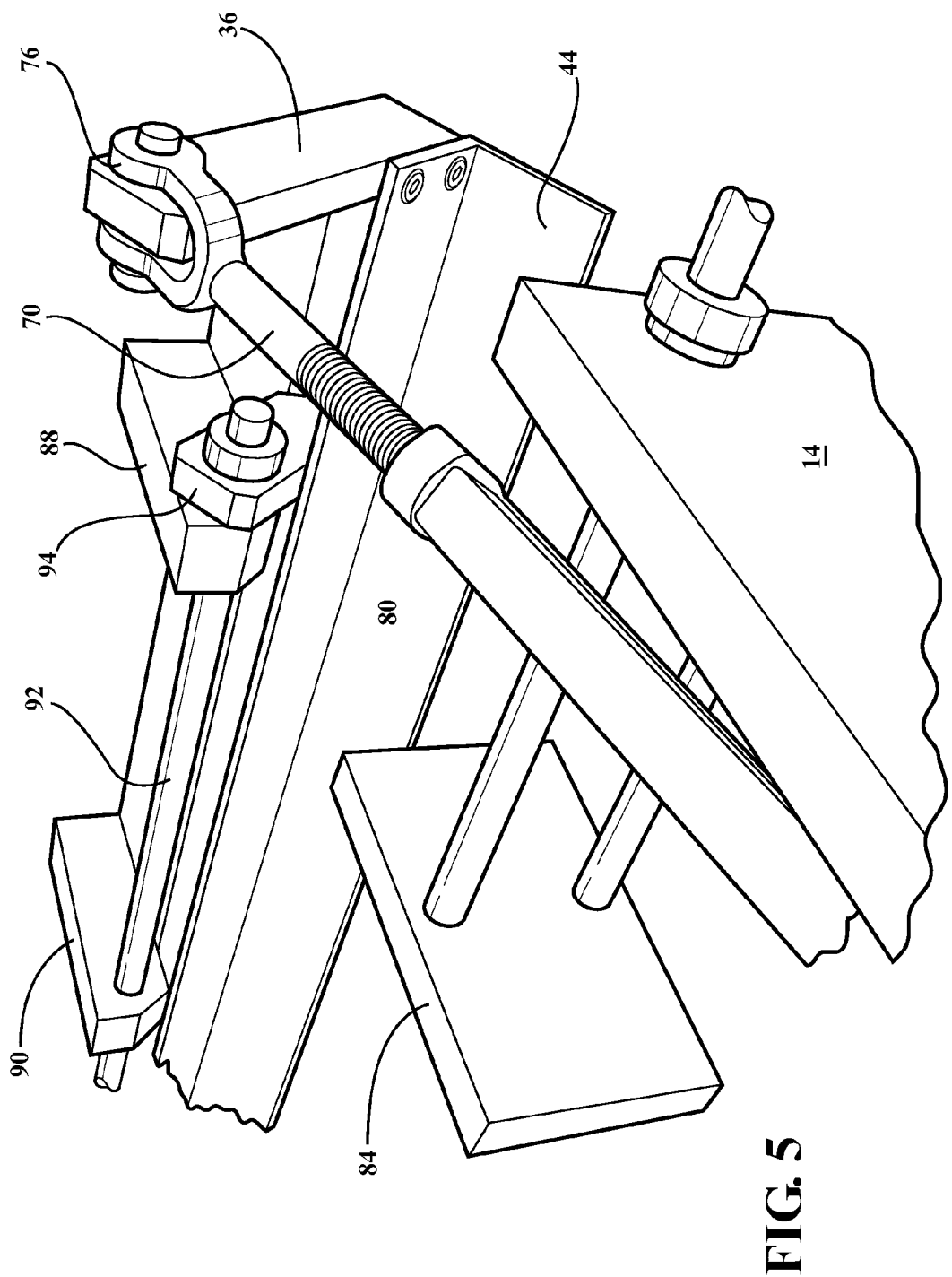
FIG. 5 is an enlarged partial perspective of a remote side edge connecting location established between a selected linkage arm and a part side supporting edge and further illustrating pivotal opening/release actuation of the supporting edge consistent with the phantom rotational position of the inner linkage arms in FIG. 4.

Additional features include a dampening assist component which is best illustrated in FIG. 5 and includes a pair of spaced apart and fixed outer side portions 88 and 90 which journal a shaft 92 therebetween. A dampening element 94 is rotary supported to a portion of the shaft 92 projecting from an opposite side of a selected outer portion (see at 88). In one embodiment, a similar dampening assist component is located each side 16 and 18 of the four sided structure and, in operation, contacts a reverse face of each of the pivotally separating "L" brackets 44 and 46 in order to control range of pivotal displacement between actuated and reset positions.

Other features include a pallet 96 supported within the open interior of the structure for receiving the released parts 8 in progressively stacking fashion. A lift mechanism (see floor supported scissor members 98 and 100 with upper pivotally supported and vertically displaceable pallet underside support 102, is located underneath the pallet 96 for progressively lowering the pallet from an initial highest elevation within the structure and concurrent with progressive stacking of previously delivered parts upon the pallet (see as best shown in FIG. 1).

Additional features include a lateral pusher mechanism, see at 104 in FIG. 1 and which extends from a fixed floor supported body 106, is located in proximity to indicated side 16 of the structure and, upon stacking a desired plurality of delivered parts, is inwardly actuated (via piston 108 in order to ejecting the stacked parts 8 and pallet 96 onto a conveyor 110 extending from an opposite side of the structure.

Having described my invention, other and additional preferred embodiments will become apparent to those skilled in the art to which it pertains, and without deviating from the scope of the appended claims.

I claim:

1. A transfer assembly incorporated into an out feed location of a part forming operation, said transfer assembly comprising:

a four sided structure exhibiting a generally open interior, an upper receiving location of said structure adapted to being located at an equivalent height to the out feed location of the part forming operation;

a pair of elongated pivotal supports extending in parallel fashion along inner facing sides of said structure and which are adapted to receive opposite edges of each part delivered to said structure from the part forming operation;

a rotary actuating disk shaped component mounted via a central pivot location at an intermediate end location of said structure between said sides, said disk shaped component exhibiting first and second projecting end locations, a third projecting end location extending from said disk shaped component at a location intermediate said first and second locations;

a pair of linkage arms pivotally supported at inner ends to said first and second projecting end locations of said rotary actuating component and at outer ends to said elongated pivotal supports;

a fluid actuated cylinder pivotally mounted at a lower end to said structure in proximity to said rotary actuating component, a centerline extending through said cylinder being at an acute angle relative to a vertical axis extending through said pivotally mounted lower end, a piston extending from said cylinder and being linearly displaceable in either of two directions by said cylinder, said piston being pivotally mounted to said third projecting end location of said rotary disk component such that said piston is capable of being sequentially extended and retracted in order to rotate said disk shaped component in first and second opposite rotational directions about said center pivot location; and a combination sensor and trigger incorporated into said structure for determining completed delivery of a part from the part forming out feed location and, upon being activated, instructing actuation of said cylinder to extend said piston in a first step to rotate said rotary component about said central pivot location and to pivotally and outwardly separate said side supports in order to release a previously delivered part for stacking in plural fashion within the open interior, said trigger reverse actuating said cylinder to retract said piston in a second step, causing said rotary component to reverse rotate and to pivotally reset said side supports for receiving a subsequently delivered part.

2. The transfer assembly according to claim 1, said combination sensor and trigger further comprising a proximity switch mounted to an end abutting location of said structure communicating with the open interior and which includes a pad shaped portion which is adapted to being contacted by a forward travelling edge of the part.

3. The transfer assembly according to claim 1, said linkage arms each further comprising a rotary adjustable turnbuckle in order to calibrate an overall length thereof.

4. The transfer assembly according to claim 1, further comprising pivot members affixed to said sides of said structure, said outer ends of said linkage members engaging upper ends of said pivot members, said pivotal supports further comprising "L" brackets mounted to inner facing and lower ends of said pivot members.

5. The transfer assembly according to claim 1, further comprising a pallet supported within the open interior of said structure for receiving the released parts in progressively stacking fashion.

6. The transfer assembly according to claim 5, further comprising a lift mechanism located underneath said pallet for progressively lowering said pallet from an initial highest elevation within said structure and concurrent with progressive stacking of previously delivered parts upon said pallet.

7. The transfer assembly according to claim 6, further comprising a lateral pusher mechanism located in proximity to a side of said structure and, upon stacking a desired plurality of delivered parts, ejecting the parts and pallet onto a conveyor extending from an opposite side of said structure.

8. The transfer assembly according to claim 1, said four sided structure further comprising four corner located legs extending downwardly from an uppermost linkage supporting perimeter defined by four horizontally interconnecting members, said legs each further including bottom located and height adjustable feet.

9. The transfer assembly according to claim 8, further comprising said rotary actuating component mounted to an inside facing side of said linkage supporting perimeter, a supporting brace extending between a selected pair of legs in proximity to said rotary actuating component and pivotally supporting said fluid actuated cylinder.

10. The transfer assembly according to claim 4, further comprising a dampening assist component located along each side of said structure and contacting a reverse face of each of said pivotally separating "L" brackets in order to control range of pivotal displacement between actuated and reset positions.

11. A transfer assembly incorporated into an out feed location of a part forming operation, said transfer assembly comprising:

a structure including an uppermost perimeter defined by four interconnected sides exhibiting a generally open interior, an upper receiving location of said structure adapted to being located at an equivalent height to the out feed location of the part forming operation;

a pair of elongated pivotal supports extending in parallel fashion along inner facing sides of said structure and which are adapted to receive therebetween in channeled and supporting fashion opposite edges of each part delivered to said structure from the part forming operation;

a rotary actuating component mounted to an inside end face of said uppermost perimeter at an intermediate end location of said structure between said sides;

a fluid actuated cylinder pivotally mounted at a lower end to a location of said structure below said rotary actuating component, a piston extending from said cylinder and being linearly displaceable in either of two direction by said cylinder and pivotally mounted to said rotary component offset from said linkage arms, a centerline extending through said piston being at an acute angle relative to a vertical axis extending through said pivotally mounted lower end;

a pair of linkage arms pivotally supported at inner ends to locations along said rotary actuating component offset from said piston, said linkage arms pivotally supported at outer ends to said elongated pivotal supports, each of said linkage arms further comprising a rotary adjustable turnbuckle in order to calibrate an overall length thereof; and at least one proximity trigger switch mounted to an end abutting location of said structure communicating with the open interior and which includes a pad shaped portion which is adapted to being contacted by a forward travelling edge of the part for determining completed delivery of a part from the part forming out feed location and, upon being activated, instructing actuation of said cylinder to extend said piston in a first step to rotate said rotary component to pivotally and outwardly separate said side supports in order to release a previously delivered part for stacking in plural fashion within the open interior, following which said trigger reverse actuates said cylinder to retract said piston in a second step, causing said rotary component to pivotally reset said side supports for receiving a subsequently delivered part.

12. The transfer assembly according to claim 11, further comprising pivot members affixed to said sides of said structure, said outer ends of said linkage members engaging upper ends of said pivot members, said pivotal supports further comprising "L" brackets mounted to inner facing and lower ends of said pivot members.

13. The transfer assembly according to claim 11, further comprising a pallet supported within the open interior of said structure for receiving the released parts in progressively stacking fashion.

14. The transfer assembly according to claim 13, further comprising a lift mechanism located underneath said pallet for progressively lowering said pallet from an initial highest elevation within said structure and concurrent with progressive stacking of previously delivered parts upon said pallet.

15. The transfer assembly according to claim 14, further comprising a lateral pusher mechanism located in proximity to a side of said structure and, upon stacking a desired plurality of delivered parts, ejecting the parts and pallet onto a conveyor extending from an opposite side of said structure.

16. The transfer assembly according to claim 11, said four sided structure further comprising four corner located legs extending downwardly from said uppermost perimeter, said legs each further including bottom located and height adjustable feet.

17. The transfer assembly according to claim 16, further comprising said rotary actuating component mounted to an inside facing side of said linkage supporting perimeter, a supporting brace extending between a selected pair of legs in proximity to said rotary actuating component and pivotally supporting said fluid actuated cylinder.

18. A transfer assembly for a thin walled part, comprising:
a multi sided structure exhibiting an open interior, an upper receiving location of said structure adapted to being located at an equivalent height to an out feed location of a part delivery conveyor;
a pair of elongated and pivotal supports extending along inner facing sides of said structure in communication with said upper receiving location, a distance between said pivotal supports permitting opposite edges of the part to be received thereupon as the part is delivered onto said structure;
a rotary supported component mounted to an inside face of said structure and at a location between said sides, a pair of linkage arms extending from inner supported ends associated with said rotary component to outer ends associated with said pivotal supports;
a fluid actuated cylinder pivotally mounted to an end location of said structure below and in proximity to said rotary actuating component such that a centerline extending through said cylinder is at an acute angle relative to a vertical line extending through said pivotally mounted end, a piston extending from said cylinder and pivotally connecting to a further location of said rotary component offset from said inner ends of said linkage arms; and
a proximity trigger switch mounted to an end abutting location of said structure communicating with the open interior and which includes a pad shaped portion which is adapted to being contacted by a forward travelling edge of the part for determining completed delivery of a part from the part forming out feed location and, upon being activated, instructing actuation of said rotary component about a pivot axis to pivotally and outwardly separate said side supports in order to release a previously delivered part for stacking in plural fashion within the open interior, following which said trigger reverse actuates said rotary component in order to pivotally reset said side supports for receiving a subsequently delivered part.

* * * * *